United States Patent
Widder et al.

(10) Patent No.: US 10,856,540 B2
(45) Date of Patent: *Dec. 8, 2020

(54) DEVICES AND METHODS FOR CONTROLLING INSECTS

(71) Applicant: Novel Textiles & Treatments LLC, New York, NY (US)

(72) Inventors: Laurie Widder, New York, NY (US); Gary Innocenti, Sr., Mahwah, NJ (US)

(73) Assignee: Novel Textiles & Treatments LLC, New York, NY (US)

(*) Notice: Subject to any disclaimer, the term of this patent is extended or adjusted under 35 U.S.C. 154(b) by 245 days.

This patent is subject to a terminal disclaimer.

(21) Appl. No.: 15/808,469

(22) Filed: Nov. 9, 2017

(65) Prior Publication Data

US 2018/0153153 A1 Jun. 7, 2018

Related U.S. Application Data

(60) Provisional application No. 62/425,561, filed on Nov. 22, 2016.

(51) Int. Cl.
*A01M 1/20* (2006.01)
*A01N 25/34* (2006.01)
(Continued)

(52) U.S. Cl.
CPC .......... *A01M 1/2055* (2013.01); *A01M 29/12* (2013.01); *A01N 25/08* (2013.01);
(Continued)

(58) Field of Classification Search
CPC ..... A01M 1/2055; A01M 29/12; A01N 25/34; A01N 25/08; A01N 53/00; D04H 3/004
See application file for complete search history.

(56) References Cited

U.S. PATENT DOCUMENTS 3,295,246 A    1/1967  Landsman et al.
3,623,659 A *  11/1971 Maierson ............... B01J 13/025
                                                        239/56
(Continued)

FOREIGN PATENT DOCUMENTS

WO    WO 97/29638 A1    8/1997
WO    WO 01/58261 A2    8/2001
(Continued)

OTHER PUBLICATIONS

International Search Report and Written Opinion for PCT/US2015/031630 dated Jul. 31, 2015.
(Continued)

*Primary Examiner* — Trevor Love
(74) *Attorney, Agent, or Firm* — Wolf, Greenfield & Sacks, P.C.

(57) ABSTRACT

Devices and methods for controlling insects are generally described. Typically, the devices include a fiber web comprising a plurality of glass fibers or other substrate made of non-absorptive material impregnated or otherwise loaded with an insect control composition comprising an active insecticidal species (e.g., a pyrethroid such as Transfluthrin). The devices provide protection against arthropods or other insects over prolonged periods of time. Such devices may be lightweight, low-cost, reusable, and disposable, and can be used for both indoor and outdoor purposes.

26 Claims, 10 Drawing Sheets

(51) Int. Cl.
  *A01M 29/12* (2011.01)
  *A01N 25/08* (2006.01)
  *D04H 3/004* (2012.01)
  *A01N 53/00* (2006.01)

(52) U.S. Cl.
  CPC .............. *A01N 25/34* (2013.01); *A01N 53/00* (2013.01); *D04H 3/004* (2013.01)

(56) References Cited

U.S. PATENT DOCUMENTS

| | | |
|---|---|---|
| 4,767,812 A | 8/1988 | Chapin et al. |
| 6,015,570 A | 1/2000 | Tucci et al. |
| 6,162,454 A | 12/2000 | Ahr et al. |
| 6,534,079 B1 | 3/2003 | Munagavalasa |
| 6,551,560 B1 | 4/2003 | Flashinski et al. |
| 6,582,714 B1 | 6/2003 | Emmrich et al. |
| 6,803,051 B1 | 10/2004 | Voris et al. |
| 10,092,003 B2 | 10/2018 | Widder et al. |
| 2005/0132500 A1 | 6/2005 | Karl et al. |
| 2009/0010977 A1 | 1/2009 | Xin et al. |
| 2012/0064323 A1 | 3/2012 | Shoemake et al. |
| 2013/0251773 A1 | 9/2013 | Galiatsatos et al. |
| 2013/0280314 A1 | 10/2013 | Ansley et al. |
| 2014/0048617 A1 | 2/2014 | Furner et al. |
| 2015/0359227 A1 | 12/2015 | Widder et al. |

FOREIGN PATENT DOCUMENTS

| | | |
|---|---|---|
| WO | WO 2013/180984 A1 | 12/2013 |
| WO | WO 2015/179440 A1 | 11/2015 |

OTHER PUBLICATIONS

International Preliminary Report on Patentability for PCT/US2015/031630 dated Dec. 1, 2016.

Office Action for U.S. Appl. No. 14/716,723 dated Mar. 31, 2016 and claims pending.

Office Action for U.S. Appl. No. 14/716,723 dated Jan. 18, 2017 and claims pending.

Office Action for U.S. Appl. No. 14/716,723 dated Dec. 14, 2017 and claims pending.

Argueta et al., Spatial repellency of metofluthrin-impregnated multilayer paper strip against Aedes albopictus under outdoor conditions, Nagasaki, Japan. Med. Entomol. Zool. 2004;55(3):211-6.

* cited by examiner

DEVICES AND METHODS FOR CONTROLLING INSECTS

RELATED APPLICATIONS

This application claims priority under 35 U.S.C. § 119(e) to U.S. Provisional Patent Application Ser. No. 62/425,561, filed Nov. 22, 2016, and entitled "Devices and Methods for Controlling Insects," which is incorporated herein by reference in its entirety for all purposes.

FIELD

Devices and methods for controlling insects are generally described.

BACKGROUND

Insecticidal agents are generally effective in repelling, knocking down, and/or killing many disease-carrying insects such as flying arthropods. For example, Transfluthrin is a vapor-active pyrethroid compound that delivers efficacy against flying arthropods. Solutions of Transfluthrin are often used in household products for controlling flying insects, many of which rely on temporary spraying or heat-diffused systems for pyrethroid release or distribution. However, these solutions can produce an unpleasant odor and/or cause respiratory irritation. Conventional devices typically require refilling/retreating frequently. Other widely-used devices include emanators which require some kind of energy source, usually electricity. Devices for outdoor use typically require either burning (flame) or a battery or cartridge. They can be expensive, bulky and difficult to pack or carry. They are typically efficacious for only very limited periods of time (less than 12 hours) and again require refilling or refueling for longer-duration protection from flying insects. Some devices that fall under this category include candles, coils, THERMACELL™, battery operated table-top repellent devices and fan-powered repellents.

SUMMARY

Disclosed herein are inventive insect killing devices that address a recognized deficiency in the military, public health (humanitarian) and consumer marketplaces for a passive repellent device that could be used both in and out of doors. Inventive devices described herein can be advantageously configured to be passive, e.g. require no outside energy source, lightweight, easy to deploy, disposable and longer-lasting (e.g. more than 24 hours). Described below are inventive textile-based devices treated with an effective insecticidal agent (also referred to herein as an "insect control composition") that can be configured to control release kinetics of the active agent to provide continuous passive release of the insect control composition in doses lethal to target insects, for example, mosquitoes, flies and sand flies. Typical prior development efforts in the industry have focused on lab testing on small numbers of mosquitoes (less than 50) in very small environments, such as glass tubes or jars, to explore repellency, knock down and kill. By contrast, inventive insecticidal devices have been demonstrated to achieve passive release of the insect control compositions over an extended period of time under more real-world testing conditions using Good Laboratory Practice (GLP) testing protocols employing hundreds of live mosquitoes of multiple species, sand flies and stable flies (e.g. see the Examples below).

Insect control devices and associated methods are described. Examples of the inventive insect control devices are summarized below.

An exemplary insect control device comprises a substrate comprising a fiber web comprising a plurality of glass fibers and an insect control composition present within the fiber web, wherein the insect control composition is present within the fiber web in an amount of greater than or equal to 0.39 milligrams per square centimeter of geometric surface area and less than or equal to 5 milligrams per square centimeter of geometric surface area, and wherein the insect control device is configured to passively release the insect control composition from the fiber web at a continuous non-zero rate of release for at least 1 day.

An exemplary insect control device comprises a substrate comprising a fiber web comprising a plurality of glass fibers and a binder and an insect control composition present within the fiber web, wherein the binder comprises urea and formaldehyde.

An exemplary insect control device comprises a substrate formed of a non-absorptive material and an insect control composition present on the non-absorptive substrate, wherein the insect control device is free of any absorptive, hydrophilic substrate containing the insect control composition, wherein the insect control composition is present on the substrate formed of a non-absorptive material in an amount of greater than or equal to 0.39 milligrams per square centimeter and less than or equal to 5 milligrams per square centimeter, and wherein the insect control composition is passively released from the substrate formed of a non-absorptive material at a continuous non-zero rate of release for at least 1 day.

Methods for fabricating an insect control device are also described. An exemplary method comprises contacting a substrate comprising a fiber web comprising a plurality of glass fibers and a binder with an insect control composition, wherein the binder comprises urea and formaldehyde.

Another exemplary method comprises passively releasing an insect control composition from a substrate comprising a fiber web of the insect control device at a non-zero rate of release for at least 1 day, wherein the fiber web comprises a plurality of glass fibers and wherein the insect control composition is initially present within the fiber web in an amount of greater than or equal to 0.39 milligrams per square centimeter of geometric surface area and less than or equal to 5 milligrams per square centimeter of geometric surface area.

Another exemplary method comprises passively releasing an insect control composition from a substrate formed of a non-absorptive material of the insect control device at a continuous non-zero rate of release for at least 1 day, wherein the insect control device is free of any absorptive, hydrophilic substrate containing the insect control composition and wherein the insect control composition is initially present on the substrate formed of a non-absorptive material in an amount of greater than or equal to 0.39 milligrams per square centimeter of geometric surface area and less than or equal to 5 milligrams per square centimeter of geometric surface area.

Furthermore, while one aspect and certain examples of the invention involve the ability to advantageously provide effective insecticidal activity of an insect control device while utilizing relatively low levels of loading of the insect control composition (e.g. in an amount between 5 milligrams per square centimeter of geometric surface area and 9.4 milligrams per square centimeter of geometric surface area on the substrate, or in some cases up to 12 milligrams per square centimeter of geometric surface area on the substrate.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
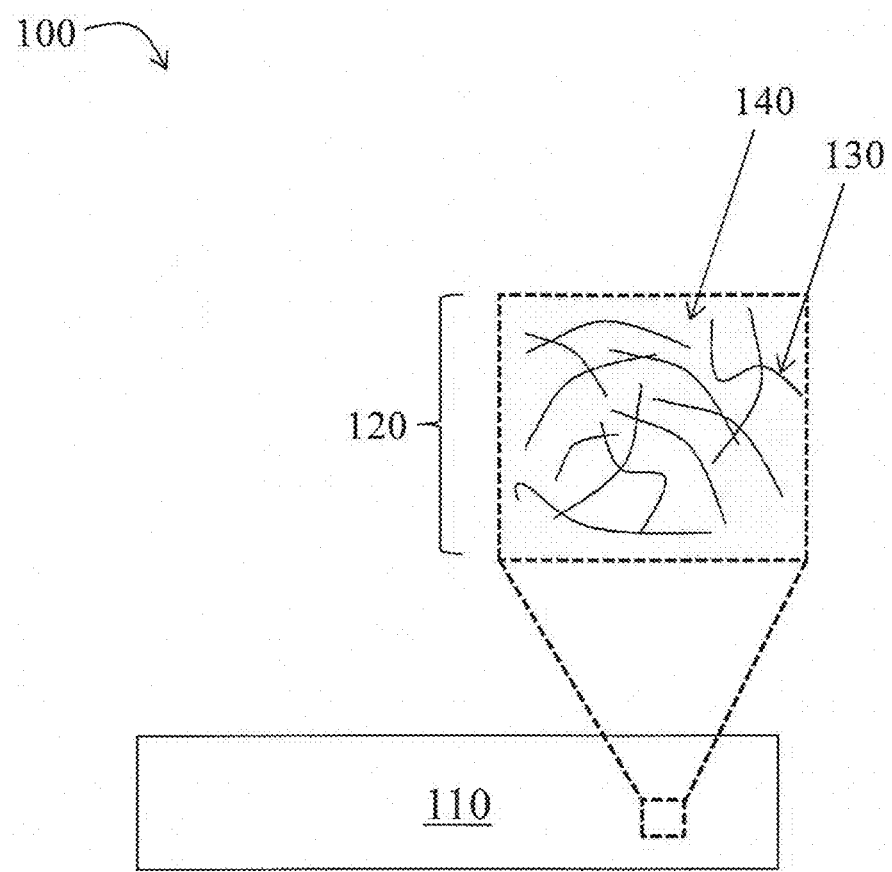
FIG. 1A shows an exemplary schematic of an insect control device.

Devices and methods for controlling insects are generally described. The devices include a fiber web comprising a plurality of glass fibers. The web may be impregnated or otherwise loaded with an insect control composition comprising an active insecticidal agent (e.g., a pyrethroid such as Transfluthrin). Devices can be configured to provide protection against arthropods or other insects over prolonged periods of time. Such devices may be lightweight, low-cost, reusable, and disposable, and can be used for both indoor and outdoor purposes.

Advantageously, the devices and methods described herein may provide passive release of the active insecticidal species at a non-zero rate of release for a relatively long time (e.g., greater than or equal to 1 day, greater than or equal to 7 days, greater than or equal to 14 days, greater than or equal to 21 days, or greater than or equal to 30 days), release the active insecticidal species over a relatively large space indoors and/or outdoors (e.g., having a 24 hour mortality area (see discussion below) of greater than or equal to 30 cubic meters), provide a relatively high 2-hour knockdown rate (see discussion below) of arthropods (e.g., greater than or equal to a 67% 2-hour knockdown rate), and/or may provide a relative high kill rate within 24 hours of initial release of arthropods (e.g., greater than or equal to 70% kill rate (see discussion below)). In some cases, the devices described herein may be loaded with an amount of insect control composition in a range of less than or equal to 5 milligrams per square centimeter of geometric surface area—see discussion below)) while achieving desirable degrees of insecticidal activity for relatively long times compared to typical traditional passive insect control devices. In other cases and applications, the insect control composition may be loaded at higher concentrations, such as between 5 milligrams per square centimeter and 9.4 milligrams per square centimeter, or as much as 12 milligrams per square centimeter of geometric surface area of the substrate of the device.

Devices described herein may be configured to provide such passive release of the insect control composition (i.e. release of the insect control composition without the need for a source of external energy, such as heat, electricity, batteries, flame, forced or circulated air or the like to facilitate the release) (e.g., a "passive" device). Advantageously, devices can be configured for completely passive release. Such devices do not require or include, for example, powered air circulation, flame, physical manipulation, heating elements/components, or the like to achieve desired or adequate release of the active insecticidal species from the device. Exemplary devices may be activated to release the insect control composition by natural, non-forced airflow and/or at ambient temperature. The release rate of the active species may be tailored by selection of the active agent(s) of the insect control composition, substrate materials, and various fabrication conditions, as described more fully below.

Advantageously, devices of the invention can be configured to not require retreatment (e.g., refilling/reloading with active agent), an outside energy source, or user action to enable (continuous) non-zero release of the active insecticidal species from the device (e.g., for at least 1 day).

The insect control device includes a substrate (e.g., a fiber web) loaded with an insect control composition comprising one or more active insect control/insecticidal agents, where the substrate or substrates are provided in a sealed container. Use of the device may then, involve unsealing the container to expose the loaded substrate(s) to the environment to be protected, upon which a vapor containing the insect control composition is released. Such a device then provides protection from insects within the environment by, for example, by repelling, knocking down, and/or killing insects such as flying arthropods (e.g., mosquitos) within a particular area. For example, a lid or other form of packaging may be removed from the sealed container to expose the loaded substrate(s) to the environment. In some cases, the loaded substrate(s) may be provided as a sheet in folded or rolled form, and may be unfolded or unrolled during use. The device may be, for example, configured to be hung or otherwise mounted on a surface, or may be a free-standing structure placed on a surface. Assembly may involve forming a quilt or pad from multiple layers loaded with substrate, for example, to create a pad for outdoor protection. The loaded substrate(s) could be provided in the form of adhesive strips that can be worn by a user on clothing, shoes, etc. The term "user" generally refers to a person or animal wearing and/or otherwise utilizing the methods and/or devices described herein.

The insect control device comprises a fiber web and an insect control composition present (e.g., impregnated) within the fiber web. The fiber web can be formed from a plurality of glass fibers. Preferably and advantageously, the insect control composition is not absorbed into the individual fibers of the plurality of glass fibers.

The insect control device comprises a substrate (e.g., a fiber web). The substrate (e.g., the fiber web) is loaded with the insect control composition. FIG. 1A shows an exemplary illustration of an insect control device 100 comprising substrate 110. Substrate 110 comprises a fiber web 120 including a plurality of glass fibers 130. Substrate 110 may be loaded with an insect control composition 140 (e.g., comprising a pyrethroid such as Transfluthrin). Substrate 110 can comprise a binder. The substrate (e.g., substrate 110) is formed of a non-absorptive material. For example, for a glass fiber web substrate, each of the plurality of individual glass fibers does not itself absorb the insect control composition in any appreciable amount. The insect control composition is present within interstices of the fiber web but not absorbed into the individual fibers comprising the web, such that the insect control composition may be released passively at a non-zero rate of release upon opening of the device (e.g., upon exposure to air). An advantage of such a web is that it is not absorptive yet it is porous allowing for ambient airflow to pass through the web (i.e. not a film which is non-porous) to enhance release of the insecticidal active ingredient. While glass fiber webs are advantageous and preferred, as an alternative, the insect control device could comprise another type of substrate formed of a non-absorptive material that is not a glass fiber web. For example, the substrate could be formed of a fiber web constructed of fibers formed of a non-glass, non-absorptive material, for example a hydrophobic and/or non-wicking polymer material such as any one or more of those listed in the following paragraph. Advantageously, the insect control device includes a substrate that is substantially hydrophobic and can be free of any substrate formed of an absorptive (wicking), hydrophilic material containing the insect control composition.

Non-limiting examples of non-absorptive, non-wicking, and/or hydrophobic materials potentially useful for forming the substrate(s) of certain insect control devises of the present invention include glass (e.g., comprising glass fibers), and certain plastics or other synthetic materials. The term hydrophobic, as used herein, generally refers to a material having a contact angle with water of greater than 90 degrees.

Non-limiting examples of substrates formed of non-absorptive materials include glass-based substrates. The substrate is a fiber web can be configured to comprise a plurality of glass fibers and a binder. For example, the fiber web may be in the form of a woven, a non-woven, a knit, or an engineered glass fiber fabric. Fiber webs described herein include a plurality of interstices or other interior spaces capable of containing insect control composition. For example, a porous fiber web may be in the form of a non-woven fibrous mesh, a woven or knit fabric, a web-like structure, or the like. The insect control composition can be loaded into the interstices/pores of the substrate. Preferred fiber webs comprise a non-woven web (e.g., comprising a plurality a glass fibers).

The glass fibers may be of any suitable size or type (e.g., for forming a non-woven fiber web). For example, the plurality of glass fibers comprises one or more of fibers having an average fiber diameter of less than 2 microns, in some cases, the plurality of glass fibers comprises one or more fibers having an average fiber diameter of greater than or equal to 2 microns and less than or equal to 20 microns), in some cases, the plurality of glass fibers comprises one or more fibers having an average fiber diameter of greater than 20 microns and less than or equal to 40 microns; and in some cases, the plurality of glass fibers comprises one or more fibers having an average fiber diameter of greater than 400 microns. In certain cases, the plurality of glass fibers may be selected from the group consisting of staple glass fibers, chopped glass fibers, engineered glass fibers, and combinations thereof. Suitable fiber webs comprising a plurality of glass fiber materials may include, for example, fiberglass sheets and St. Gobain FibaFuse™.

Typical substrates (e.g. non-woven substrates) comprise a binder. The binder may stabilize the fibers in a fiber web or other woven/non-woven fibrous substrate, and/or the binder may interact with the insect control composition such that it facilitates/control release of the active insecticidal agents. Binders for fiber webs and fabrics are generally known in the art and may comprise any suitable binder material (e.g., polymers such as curable polymers). In some embodiments, the binder may be hydrophobic and/or non-absorptive. One of ordinary skill in the art could use various screening tests to determine a suitable binder for use in an insect control device as described herein including, for example, testing for effectiveness in performing desired binding functions (e.g., of fibers in the fiber web), compatibility with the active insecticidal species and other materials in the insect control device, and/or testing the ability of the binder to permit or facilitate desired active insecticidal species containment, loading, and/or release characteristics. In certain instances, suitable emulsifiers may also be employed to assist in forming and/or loading of a substrate, as would be appreciated by those skilled in the art.

The binder may comprise an organic binder (e.g., bitums, animal glues, plant glues, polymers). The binder may comprise an inorganic binder (e.g., lime, cement, gypsum, liquid glass, or the like). Non-limiting examples of suitable binders include urea formaldehyde resins, melamine formaldehyde resins, phenol-formaldehyde resins, polyurethanes, acrylic polymers/copolymers (e.g. styrene-acrylic copolymers), vinyl acetate, silane coupling agents (e.g. vinylsilanes, acryloxy silanes, epoxysilanes, aminosilane), and combinations thereof. In an exemplary embodiment, the binder comprises urea and/or formaldehyde (e.g., a urea formaldehyde polymeric resin). The binder may, if desired, be cured (e.g., crosslinked).

The insect control composition comprises one or more active insecticidal agents. Generally, the insect control composition may comprise at least one type of pyrethroid compound that, when released from the device, may repel, knock down, and/or kill arthropods (e.g., mosquitos) within a certain area. Pyrethroids are known in the art and include Transfluthrin, tefluthrin, metofluthrin, allethrin, fenfluthrin, kadethrin, neopynamins, prallethrin, vapothrin, esbiothrin, dichlovos (DDVP), and combinations thereof. For example, the active insecticidal agent may be a pyrethroid such as Transfluthrin. It should be understood that other compounds with insect control/insecticidal properties may also be suitable for use. The pyrethroid is preferably loaded onto the substrate(s) (e.g. onto a fiber web) as a solution or fluent coating, but dry loading, such as with a powder, particles, or the like, is also contemplated.

The active insecticidal agents can be selected to have a particular vapor pressure (e.g., such that the insect control composition is released when in contact with air). The vapor pressure of the pyrethroid, or other active insecticidal agents may be selected to be between about $1\times10^{-4}$ and about $10\times10^{-4}$ Pascals at 20° C. The vapor pressure of the active insecticidal agent may be at least about $1\times10^{-4}$, at least about $2\times10^{-4}$, at least about $4\times10^{-4}$, at least about $6\times10^{-4}$, at least about $8\times10^{-4}$, or at least about $9\times10^{-4}$ Pascals at 20° C.

As described herein, the insect control composition may be present in the fiber web in a relatively low amount compared to typical conventional insect control devices. In exemplary devices, the insect control composition is present in the fiber web/on the substrate in an amount of greater than or equal to 0.1 milligrams and less than or equal to 5 milligrams per square centimeter of geometric surface area, greater than or equal to 0.25 milligrams and less than or equal to 5 milligrams per square centimeter of geometric surface area, greater than or equal to 0.39 milligrams and less than or equal to 5 milligrams per square centimeter of geometric surface area, greater than or equal to 0.1 milligrams per square centimeter and less than or equal to 0.5 milligrams per square centimeter of geometric surface area, greater than or equal to 0.25 milligrams and less than or equal to 0.75 milligrams per square centimeter of geometric surface area, greater than or equal to 0.25 milligrams and less than or equal to 2 milligrams per square centimeter of geometric surface area, greater than or equal to 0.39 milligrams and less than or equal to 1 milligram per square centimeter of geometric surface area, greater than or equal to 0.5 milligrams and less than or equal to 1 milligram per square centimeter of geometric surface area, greater than or equal to 0.75 milligrams and less than or equal to 2 milligrams per square centimeter of geometric surface area, greater than or equal to 1 milligram and less than or equal to 3 milligrams per square centimeter of geometric surface area, or greater than or equal to 1.5 milligrams and less than or equal to 5 milligrams per square centimeter of geometric surface area. Other ranges are also possible. For example, in some cases and applications, the insect control composition may be loaded at higher concentrations, such as between 5 milligrams per square centimeter and 9.4 milligrams per square centimeter, or as much as 12 milligrams per square centimeter of geometric surface area of the substrate of the device.

Figure 1B:
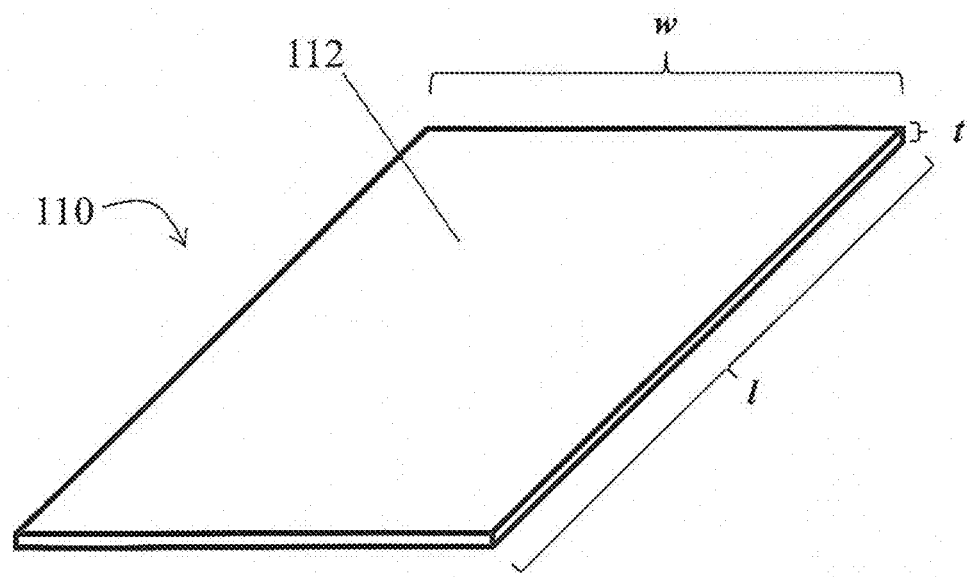
FIG. 1B shows an exemplary schematic of a fiber web.

The "geometric surface area," as used herein, refers to the macroscopic, shape-based external surface area of the substrate defined, for example for a rectangular substrate, by the product of the length of the substrate multiplied by the width of the substrate. This area is to be contrasted with the specific/total surface area of the substrate as would be measured, for example, by a gas adsorption technique. For example, as illustrated in FIG. 1B, fiber web 110 has surface 112 with a geometric surface area defined by the width, w, multiplied by length, l, of fiber web 110. Those skilled in the art would also understand based upon the teachings of this specification that the geometric surface area of a planar substrate or a substrate in the form of a curved plane, the geometric (e.g. sheet materials where the thickness (t) of the substrate is less than 10% of the smaller of the length (l) and width (w) dimension)) is based upon the two-dimensional area of largest, en face, surface (i.e. the multiplied product of the larger two of the X-Y- and Z dimensions) and does not refer to the surface area of all of the external surfaces/sides of the three-dimensional shape (i.e. is not an area calculated using the thickness—e.g., thickness, t, in FIG. 1B—of the fiber web 110). For other solid shapes not in the form of a plane or curved plane and not constructed from component substrate(s) that are in the form of a plane or curved plane (e.g. through layering/shaping/combining multiple substrates together, etc.) where the above formula for geometric surface area would apply to each component—e.g. solid materials (which may be porous) with planar faces where thickness exceeds the limits noted above, spheres, cubes, pyramids, cylinders, complex shapes, etc., the geometric surface area would be the external surface area of such shape (e.g. for a sphere, equal to $4\pi r^2$).

Advantageously, the total loading of the device may also be relatively low. In exemplary devices, the total amount of insect control composition present on the device is less than or equal to 6 grams, less than or equal to 3 grams, less than or equal to 2.5 grams, less than or equal to 2 grams, less than or equal to 1.5 grams, or less than or equal to 1 gram. In certain embodiments, the total amount of insect control composition present on the device is greater than or equal to 0.5 grams, greater than or equal to 1 gram, greater than or equal to 1.5 grams, greater than or equal to 2 grams, or greater than or equal to 2.5 grams. Combinations of the above-referenced ranges are also possible (e.g., greater than or equal to 0.5 grams and less than or equal to 3 grams, greater than or equal to 0.5 grams and less than or equal to 1.5 grams). Other ranges are also possible depending on the overall size of the device and substrate, as would be understood by the person of ordinary skill in the art.

As mentioned above, for certain applications, it may be desirable for the amount of insect control composition present in the fiber web to be somewhat higher than typical ranges noted above (e.g., greater than 5 milligrams and less than or equal to 9.4 milligrams, or less than or equal to 12 milligrams, or greater than 12 milligrams per square centimeter of geometric surface area). Devices and methods for loading substrates with relatively higher amounts of active insecticidal species are described, for example, in co-owned U.S. Patent Publication Number 2015/0359227, entitled "Insect Control Device and Associated Methods", filed May 19, 2015 and in International Patent Publication Number US2015/031630, entitled "Insect Control Device and Associated Methods," filed May 19, 2015, each of which is incorporated herein by reference in its entirety.

The insect control device (e.g., comprising a fiber web comprising a plurality of glass fibers, a binder, and an insect control composition) can advantageously be configured so that the insect control composition is passively released from the fiber web at a non-zero rate of release for a relatively long time. For example, it may be advantageous, to select a combination of one or more of an insect control composition, a substrate, and/or a method of fabrication, as described herein, to produce a desired release rate for the insect control composition. For example, in some cases, a desired release rate may be achieved by choosing an appropriate combination of insect control composition and/or binder and/or substrate (e.g., comprising a fiber web including a plurality of glass fibers) with, optionally, a particular method of fabrication. Screening tests for selection of the appropriate combinations may include applying a pyrethroid, or other active species, mixed with a fluid carrier and/or binder to a substrate via a selected method of fabrication and evaluating the release rate of the substrate.

In exemplary devices, the insect control composition is released passively from the substrate (e.g. fiber web) at a non-zero rate of release for a particular length of time, for example greater than or equal to 1 day, greater than or equal to 2 days, greater than or equal to 3 days, greater than or equal to 4 days, greater than or equal to 5 days, greater than or equal to 6 days, greater than or equal to 7 days, greater than or equal to 10 days, greater than or equal to 14 days, greater than or equal to 21 days, or greater than or equal to 30 days. In certain embodiments, the insect control composition is released passively from the fiber web at a non-zero rate of release for up to 60 days, up to 30 days, up to 21 days, up to 14 days, up to 10 days, up to 7 days, up to 6 days, up to 5 days, up to 4 days, up to 3 days, or up to 2 days. Combinations of the above-referenced ranges are included (e.g., greater than or equal to 1 day and up to 60 days, greater than or equal to 1 day and up to 21 days, greater than or equal to 7 days and up to 30 days, greater than or equal to 2 days and up to 60 days; greater than or equal to 3 days and up to 60 days; etc.). Other ranges are also included. In some cases, after a certain period of time (e.g., 1 day, 7 days, 14 days, 21 days) of a continuous non-zero rate of release of the insect control composition, greater than or equal to 1 wt. %, greater than or equal to 2 wt. %, greater than or equal to 5 wt. %, greater than or equal to 10 wt. %, greater than or equal to 25 wt. %, or greater than or equal to 50 wt. % of the insect control composition is present within the fiber web of the insect control device and, at least a portion of the remaining insect control composition, is configured to be released at a non-zero release rate while in use.

Certain methods of fabrication disclosed herein involve the selection of various materials, fabrication processes, conditions, and/or other components to produce an insect control device having a desired level of effectiveness, for example a particular release rate, or set of release rates, of the active insecticidal species. For example, the release rate can be selected, as described herein, such that the insect control device remains effective (e.g., in the knock-down, repulsion, and/or killing of arthropod insects) for greater than or equal to 1 day, greater than or equal to 2 days, greater than or equal to 3 days, greater than or equal to 4 days, greater than or equal to 5 days, greater than or equal to 6 days, greater than or equal to 7 days, greater than or equal to 10 days, greater than or equal to 14 days, greater than or equal to 21 days, or greater than or equal to 30 days. In certain cases, the insect control device can remain effective for up to 60 days, up to 30 days, up to 21 days, up to 14 days, up to 10 days, up to 7 days, up to 6 days, up to 5 days, up to 4 days, up to 3 days, or up to 2 days. Combinations of the above-referenced ranges are also included (e.g., greater than or equal to 1 day and up to 60 days, greater than or equal to 1 day and up to 21 days, greater than or equal to 7 days and up to 30 days; greater than or equal to 2 days and up to 21 days; greater than or equal to 3 days and up to 21 days; etc.). Other ranges are also possible.

Over a sufficient period of time, the insect control composition will substantially or completely dissipate from the substrate (e.g. fiber web). In exemplary devices, substantially all of the insect control composition is released from the substrate within 3 days, 7 days, 14 days, 21 days, 30 days, or 60 days. In certain cases, the insect control composition can be released from the substrate at a different rate (e.g., a first non-zero release rate) on the first day as compared to after 7 days, after 14 days, after 21 days, and/or after 30 days (e.g., a second non-zero release rate). For example, after a certain period of time of release, less than about 10 wt. %, less than about 5 wt. %, less than about 2 wt. %, or less than about 1 wt. % of the pyrethroid (or other active insecticidal species) may be present on the substrate as compared to insect control composition initially loaded onto the substrate.

Insect control devices described herein can be configured to have desirable kill rates (e.g., kill rates within 24 hours of initial release of the insect control composition indoors and/or kill rates within 24 hours of initial release of the insect control composition in limited outdoor conditions) and/or 2-hour knockdown rates.

For example, the insect control device may have a kill rate within 24 hours of initial release of the insect control composition indoors of greater than or equal to 70%, greater than or equal to 75%, greater than or equal to 80%, greater than or equal to 85%, greater than or equal to 90%, greater than or equal to 95%, greater than or equal to 98%, greater than or equal to 99%, or greater than or equal to 99.9%. The insect control device may be configured to have a kill rate within 24 hours of initial release of the insect control composition indoors of up to 100%, up to 99.9%, up to 99%, up to 98%, up to 95%, up to 90%, up to 85%, or up to 80%. Combinations of the above-referenced ranges are also included (e.g., greater than or equal to 70% and up to 100%, greater than or equal to 90% and up to 100%, greater than or equal to 98% and up to 100%; etc.). Other ranges are also possible. Certain insect control devices can have a 100% kill rate within 24 hours of initial release of the insect control composition indoors. Kill rates within 24 hours of initial release of the insect control composition "indoors" or "in indoor conditions" as used herein is defined as measured by releasing *Aedes aegypti* mosquitos in a 30 m$^3$ closed chamber at 80° F., with no external air flow/wind, and 80% relative humidity via placing the insect control device in the center of the chamber above a 23 cm diameter fan used for air circulation in the chamber and opening the device such that the insect control composition is released from the insect control device. The kill rate (e.g., mortality) is the percentage of the initial mosquitos present which are killed within 24 hours of exposing the mosquitoes to the insect control composition. While the kill rate indoors measured as described above relates to kill rates for *Aedes aegypti* mosquitos, the ranges described herein also generally will apply to other species of mosquitos including, for example, *Culex quinquefasciatus* and *Anopheles quadrimaculatus*, as well as other flies including, for example a stable fly, *Stomoxys calcitrans*, and a sand fly, *Phlebotomus papatasi*.

Exemplary devices can have a kill rate within 24 hours of initial release of the insect control composition in limited outdoor conditions of greater than or equal to 70%, greater than or equal to 75%, greater than or equal to 80%, greater than or equal to 85%, greater than or equal to 90%, greater than or equal to 95%, greater than or equal to 98%, greater than or equal to 99%, or greater than or equal to 99.9%. Exemplary devices can have a kill rate within 24 hours of initial release of the insect control composition limited outdoor conditions of up to 100%, up to 99.9%, up to 99%, up to 98%, up to 95%, up to 90%, up to 85%, or up to 80%. Combinations of the above-referenced ranges are also included (e.g., greater than or equal to 70% and up to 100%, greater than or equal to 90% and up to 100%, greater than or equal to 98% and up to 100%; etc.). Other ranges are also included. Kill rates within 24 hours of initial release of the insect control composition "in limited outdoor conditions" as used herein is defined as measured by providing *Aedes aegypti* mosquitos, in an outdoor, unsealed area measuring 37 cubic meters in volume (1300 cubic feet) at approximately 80° F., and 80% relative humidity and placing one or more insect control device(s) within the area at a distance of up to 18 feet from the location of the mosquitos. The kill rate is the percentage of mosquitos initially present which have been killed within 24 hours of exposing the mosquitoes to the insect control composition. While the kill rates in limited outdoor conditions described above relate to kill rates for *Aedes aegypti* mosquitos, the ranges described herein also apply to other species of mosquitos including, for example, *Culex quinquefasciatus* and *Anopheles quadrimaculatus*, as well as other flies including, for example a stable fly, *Stomoxys calcitrans*, and a sand fly, *Phlebotomus papatasi*.

Exemplary insect control devices may have an average 2-hour knockdown rate of greater than or equal to 67%, greater than or equal to 70%, greater than or equal to 75%, greater than or equal to 80%, greater than or equal to 85%, greater than or equal to 90%, greater than or equal to 95%, greater than or equal to 98%, greater than or equal to 99%, or greater than or equal to 99.9%. In some cases, the 2-hour knockdown rate of the insect control device is up to 100%, up to 99.9%, up to 98%, up to 95%, up to 90%, up to 85%, up to 80%, or up to 70%. Combinations of the above-referenced ranges are also included (e.g., greater than or equal to 67% and up to 100%, greater than or equal to 90% and up to 100%, greater than or equal to 98% and up to 100%; etc.). Other ranges are also possible. "2-hour knockdown rates" as used herein are defined as measured by releasing *Aedes aegypti* mosquitos in a 30 m$^3$ closed chamber at 80° F., no external air flow/wind, and 80% relative humidity and placing the insect control device in the center of the chamber and opening the device such that the insect control composition is released from the insect control device. The 2-hour knockdown rate thus measured is the percentage of mosquitos initially present which are capable of displaying directional movement, but the movement is uncoordinated (e.g., difficulty walking or being observed lying on their back or side after landing) and/or which are unable to engage in directional movement but appendages are vigorously moving, within 2 hours of exposing the mosquitoes to the insect control composition. While the 2-hour knockdown rates described above relate to *Aedes aegypti* mosquitos, the ranges described herein also apply to other species of mosquitos including, for example, *Culex quinquefasciatus* and *Anopheles quadrimaculatus*, as well as other flies including, for example a stable fly, *Stomoxys calcitrans*, and a sand fly, *Phlebotomus papatasi*.

Exemplary insect control devices may have a particular non-zero 2-hour knockdown rate area. For example, an insect control device may have a 2-hour knockdown rate of greater than 50% (e.g., greater than 75%) in an indoor (closed) area of at least 30 cubic meters. Exemplary insect control devices may have a non-zero 2-hour knockdown rate area of at least 30 cubic meters, at least 45 cubic meters, at least 60 cubic meters, at least 75 cubic meters, at least 90 cubic meters, at least 100 cubic meters, or at least 150 cubic meters. In some such examples, the insect control device can be sized, configured, and positioned to have a non-zero 2-hour knockdown rate area of up to 200 cubic meters, up to 150 cubic meters, up to 100 cubic meters, up to 90 cubic meters, up to 75 cubic meters, up to 60 cubic meters, or up to 45 cubic meters. Combinations of the above-referenced ranges are also included (e.g., at least 30 cubic meters and up to 200 cubic meters; etc.). Other ranges are also possible.

The insect control device can be configured to have a particular 24-hour kill rate area. For example, in certain embodiments the insect control device has a 24-hour kill rate of greater than 50%, greater than 65%, or e.g., greater than 75% in an indoor (closed) area of at least 30 cubic meters. Certain insect control devices have a non-zero 24-hour kill rate area of at least 30 cubic meters, at least 45 cubic meters, at least 60 cubic meters, at least 75 cubic meters, at least 90 cubic meters, at least 100 cubic meters, or at least 150 cubic meters. In some cases, the insect control device has a non-zero 24-hour kill rate area up to 200 cubic meters, up to 150 cubic meters, up to 100 cubic meters, up to 90 cubic meters, up to 75 cubic meters, up to 60 cubic meters, or up to 45 cubic meters. Combinations of the above-referenced ranges are also included (e.g., at least 30 cubic meters and up to 200 cubic meters, etc.). Other ranges are also possible.

Figure 2:
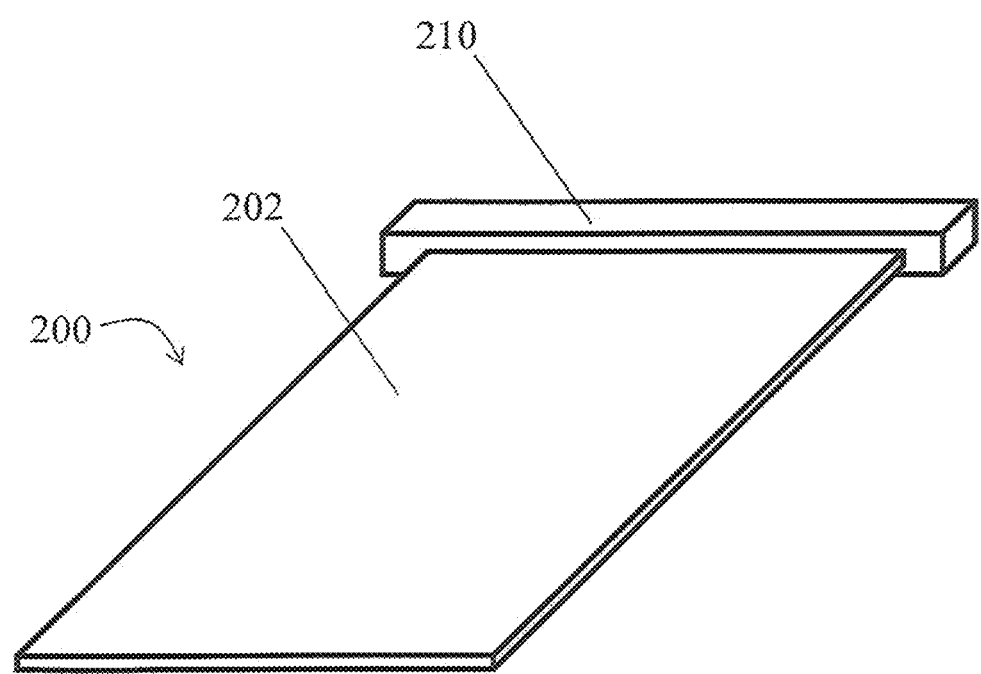
FIG. 2 shows an exemplary schematic of an insect control device.
Figure 5:
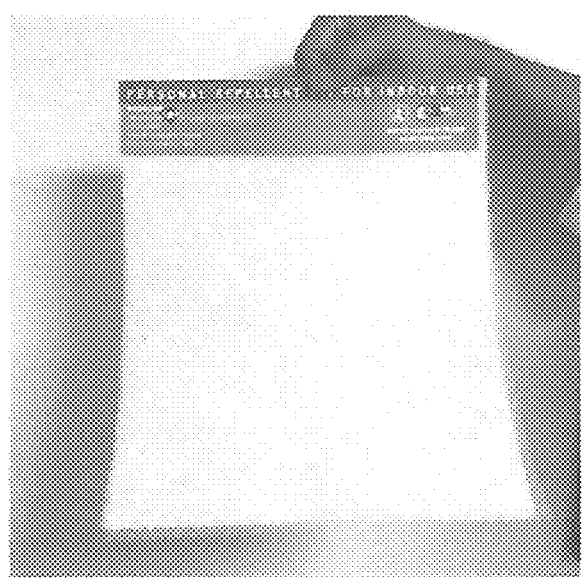
FIG. 5 is a photocopy of a photograph of an exemplary glass fiber web substrate.

Advantageously, the insect control device can be designed to be opened/deployed, releasing an active insecticidal agent at a desirable release rate, and subsequently closed, preventing the further release of the active insecticidal species and preserving the lifespan of the insect control device (e.g., by placing in a sealed container, and/or encasing in a small, thin, reusable shell or case). For example, in some exemplary devices, the substrate (e.g., a fiber web comprising a plurality of glass fibers) is attached to a base material. FIG. 2 shows an exemplary illustration of an insect control device 200, which includes a substrate 202 attached to a base material 210. Substrate 202 may be loaded with a pyrethroid such as Transfluthrin, and may be activated to release the pyrethroid as air flows through device 200 in a direction 220. A photocopy of an example of such a substrate is shown in FIG. 5.

Figure 6A:
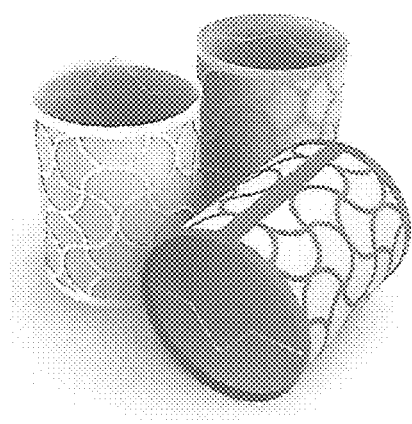
FIG. 6A is a photocopy of a photograph of an first exemplary configuration for an insect control device employing the fiber web material as illustrated in FIG. 5.
Figure 6B:
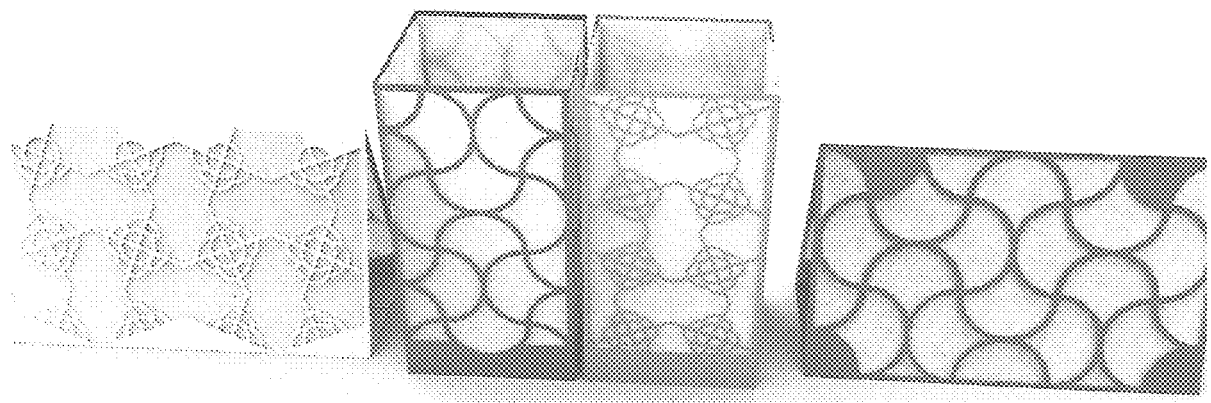
FIG. 6B is a photocopy of a photograph of a second exemplary configuration for an insect control device employing the fiber web material as illustrated in FIG. 5.

The insect control device may be configured for consumer use, comprising a carrier (e.g., a mesh carrier, a shell, a protective cover, a container, or the like), to prevent dermal contact/skin irritation. Certain such insect control devices have a first (e.g., open/deployed) configuration and a second (e.g., closed) configuration. In certain cases, such an insect control device may have a third (e.g., partially open/deployed) configuration. In some cases, a user may obtain or select between the first, second, and/or third configurations by, for example, expanding or compressing the substrate and/or base material. Some exemplary device configurations illustrating potential assembled and deployed designs are shown in FIGS. 6A and 6B.

Certain insect control device may be assembled by quilting multiple layers of treated substrates (e.g., fiber webs comprising a plurality of glass fibers) together, and then packaging or otherwise configuring the device for storage in an inactive state (e.g., in a sealed container) where the pyrethroid is not released to an open space or environment. The quilted layers of treated substrates can be opened, assembled, if needed, and placed in a desired location to repel and/or kill insects.

In some cases, the insect control device is arranged in combination with a self-adhesive strip for attachment to clothing and apparel (e.g., shirts, pants, boots, backpacks, duffel bags, footwear, and the like), and/or to surfaces (e.g., ceilings and/or beams of tents, temporary structures, or permanent structures). As noted herein, the insect control composition may be released and/or exposed, and release of the vapor containing e.g. a pyrethroid activated by airflow and/or ambient heat. In certain cases, active insecticidal species may be released and/or exposed and release of the vapor containing the pyrethroid may be activated by relatively minimal airflow.

The insect control device may be configured to be freestanding. For example, the insect control device may be configured to be placed on a shelf, a table, and/or a floor. Advantageously, the design of the insect control device, as described herein, can allow in certain cases for the insect control device to be easily scaled to address the need of a particular environment (e.g., indoors vs. outdoors) as compared to existing insect control devices which require sources of power and/or have limited flexibility for product dimensions and are mainly for outdoor use. Insect control devices may, for example, range in size from 4 in.×4 in.×4 in. to 10 in.×10 in.×6 in., or larger. For example, the insect control device may have at least one dimension (e.g., length, width, and/or height) of at least about 4 inches, at least about 6 inches, at least about 8 inches, or at least about 10 inches. In some cases, the insect control device has at least one dimension less than or equal to about 12 inches, less than or equal to about 10 inches, less than or equal to about 8 inches, or less than or equal to about 6 inches. Combinations of the above-referenced ranges are also included (e.g., a length, width, and/or height of between about 4 inches and about 10 inches or between about 6 inches and about 10 inches, etc.). Other ranges are also possible.

For devices employing planar/curved plane sheet substrates (e.g., certain fiber web substrates comprising a plurality of glass fibers) dimensions may be selected to yield a particular desired thickness. In some examples, the thickness of the substrate (e.g., the fiber web comprising a plurality of glass fibers) ranges between about 1 micron and about 2000 microns, between about 1 micron and about 1000 microns, or between about 1 micron and about 500 microns. In one particular embodiment, the thickness is about 423 μm. Other thicknesses are also possible.

In certain devices, the substrate (e.g., the fiber web comprising a plurality of glass fibers) may have a particular basis weight. For example, the basis weight may range between about 1 lbs./100 ft$^2$ and about 5 lbs./100 ft$^2$, between about 0.5 lbs./100 ft$^2$ and about 4 lbs./100 ft$^2$, or between about 0.5 lbs./100 ft$^2$ and about 2 lbs./100 ft$^2$. In one particular example, the basis weight is about 1.1 lbs./100 ft$^2$. Other basis weights are also possible.

Methods for fabricating an insect control device are also provided. The methods in certain cases comprise contacting (loading) the insect control composition onto the substrate. For example, by contacting a substrate comprising a fiber web comprising a plurality of glass fibers with an insect control composition.

The substrate (e.g., comprising a fiber web) may be treated with an agent such as binder and/or emulsifier, etc. before loading the insect control composition. In certain embodiments, such agents may be added in combination with the insect control composition. In some cases, such agents may be added after loading the substrate with the insect control composition. In certain cases, the insect control composition is contacted with the substrate in vapor, aerosol and/or liquid form (e.g., as a solution comprising the active insecticide species). The insect control composition could be provided initially in dry form (e.g., a powder) that is mixed with a fluid carrier (e.g., a solvent) to form a mixture comprising the insect control composition that is then loaded onto the substrate. In some instances, the insect control composition could be dispersed or dissolved in a fluid carrier (e.g., a solvent) and/or an aqueous phase (e.g., water) to form the mixture, which is then placed into contact with the substrate. The methods may involve loading a substrate with the insect control composition (or mixture comprising the insect control composition) using various processes including spraying, wet processes (e.g., wet-dipping), or combinations thereof. In certain cases, the insect control composition (or mixture comprising the insect control composition) could be sprayed onto the substrate in suspension form. The loaded substrate may then be further processed to produce the device. For example, the loaded substrate may be coated with additional materials, annealed, and/or arranged in combination with other components, such as a container. In some cases, the loaded substrate is contained/stored/shipped within a sealed container.

Some methods may comprise the use of one or more forms of chemical treatment/application of chemical energy, such as selection of a chemical reagent, or application of physical energy, or other selection and/or manipulation of materials and/or processing conditions, that may be applied to the substrate(s) prior to, during, and/or subsequent to application of the insect control composition. Such forms of chemical/physical energy/treatments may be used to accelerate or inhibit the release of insect control composition from the substrate during use. In some cases, devices may be fabricated and designed so that the insect control composition may be substantially depleted from the substrate over a specified time interval such that, after use, the device may be safely disposed of, thereby reducing environmental risks associated with insecticide disposal. In each case, the effect and desirability of such treatment may be determined based on screening tests on the fabricated product to determine the release rate(s) of the active insect control ingredient(s). Those skilled in the art would be capable of selecting suitable screening tests based on the teachings of this specification.

In some cases, the substrate (e.g., fiber web comprising a plurality of glass fibers) may be selected to have surface energy/wettability properties that impart a particular release rate of an insect control composition. For example, certain substrate properties may allow for control over the release and evaporation rates of a pyrethroid, or other active species (e.g., hydrophobicity).

The substrate material may be selected to have pores or interstices of a particular size, density, and or shape. For example, the substrate may be selected to be capable of being loaded with a sufficient amount of insect control composition, while also being capable of allowing sufficient amount of air to flow through the substrate.

The selection of the fluid carrier used during the fabrication process may affect the resulting release rate of the insect control composition. For example, during fabrication, the fluid carrier may be combined with an active insecticidal agent(s) (e.g., in powder form, in particle form). In some cases, the fluid carrier may partially or completely dissolve the active insecticidal agents, which, when applied to the substrate, may result in controlled and non-zero release rate of the insect control composition comprising during use (e.g., for at least 1 day). In some embodiments, the active insecticidal agent(s) may be evenly dispersed within the fluid carrier such that, when applied to the substrate, the insect control composition has a controlled and relatively consistent release rate. In some cases, the insect control composition may be released at a relatively consistent release rate during use. Those skilled in the art would understand that consistent release rate does not refer to an exact release rate, but instead generally refers to a release rate that does not significantly deviate (e.g., more than about 5%, more than about 10%, or more than about 20%) from an average release rate.

Suitable (or potentially suitable) solvents may depend on the particular insect control agent(s) employed. Non-limiting examples of suitable solvents for pyrethroid compounds include organic solvents, such as acetone, benzene, p-cresol, toluene, xylene, diethyl ether, glycol monomethyl or dimethyl ether, petroleum ether, hexane, cyclohexane, methylene chloride, chloroform, carbon tetrachloride, dioxane, tetrahydrofuran (THF), dimethyl sulfoxide, dimethylformamide, N-methyl-2-pyrrolidone, hexamethyl-phosphoric triamide, ethyl acetate, pyridine, triethylamine, picoline, mixtures thereof, or the like. In certain embodiments, the solvent is a polar aprotic solvent (e.g., propylene carbonate, dimethylformamide, N-methyl-2-pyrrolidone).

In some cases, the fluid carrier may be characterized by and selected based upon its boiling point. For example, the fluid carrier may be selected to have a boiling point such that the release rate of the insect control composition from the loaded substrate is accelerated (e.g., as compared to the loading the active insecticidal agent(s) without such fluid carrier). In other cases, the fluid carrier may be selected to decrease the release rate of the insect control composition from the loaded substrate (e.g., the fluid carrier having a boiling point such that the release rate is decreased as compared to loading the active insecticidal agent(s) without such fluid carrier). In some instances, the fluid carrier may be a relatively volatile fluid carrier. A simple screening test for selection of the appropriate fluid carrier may include applying mixtures containing a pyrethroid, or other desired active insecticidal agent, in a series of fluid carriers to the desired substrate(s), and evaluating the release rate of the loaded substrates using methods disclosed herein.

In some cases, the insect control device can be fabricated by contacting a substrate (e.g., a substrate material) with a mixture comprising an insect control composition (e.g., comprising an active insecticidal agent such as a pyrethroid), a fluid carrier, and, optionally, an aqueous solution thereby producing a loaded substrate comprising the insect control composition. Such method (e.g., for fabricating the device) can involve contacting one or more fiber webs comprising a plurality of glass fibers and a binder, with an insect control composition comprising a pyrethroid (or other active insecticidal agent), a fluid carrier, and, optionally, an aqueous solution thereby producing a loaded substrate comprising the insect control composition. Methods disclosed herein may involve loading more than one type of pyrethroid, or other active insecticidal agent, onto a substrate, either simultaneously or sequentially.

The insect control composition may be combined with a fluid carrier (e.g., solvent) prior to coating the substrate to form a mixture containing the insect control composition. In some cases, the mixture may include water or an aqueous solution that may be mixed with the active insecticidal agent(s) using various methods known in the art (e.g., sonication) prior to loading onto a substrate. In some cases, the mixture comprising the insect control composition may be formulated and/or mixed (e.g. via sonication and/or homogenization). The mixture comprising the insect control composition may comprise additional agents to control the release rate of insect control composition from a substrate. In some cases, the mixture comprising the insect control composition comprises a surfactant/emulsifier. A surfactant/surfactant mixture may be selected by the person of ordinary skill using routine formulation and screening tests based upon the active insecticidal agent(s) used and the substrate being coated. Many suitable or potentially suitable surfactants are known in the art. The surfactants may be nonionic, anionic, cationic, or zwitterionic. Exemplary potentially suitable nonionic surfactants include but are not limited to polysorbates (e.g. Tween™ surfactants), Triton X-100™, sorbitan, sorbitan tristearate, sorbitan monostearate, poloxamers (e.g. Synperonics™, Pluronics™, and Kollophor™), cocamides, cetyl alcohol, and alkyl polyglycosides; exemplary potentially suitable anionic surfactants include but are not limited to lauryl/dodecyl sulfates, alkyl sulfates, sodium laurate, sodium laureth sulfate, sodium dodecyl benzenesulfonates, sodium myreth sulfate, and sodium stearate; exemplary potentially suitable cationic surfactants include but are not limited to quaternary ammonium salts such as benzalkonium chloride, and exemplary potentially suitable zwitterionic surfactants include but are not limited to sodium lauroamphoacetate, phospholipids such as lecithin, lauryl dimethylamine/dodecyl dimethylamine oxide, and hydroxysultaines.

The step of contacting may involve dipping, soaking, or otherwise immersing the substrate in the insect control composition or mixture (e.g., via a wet application/process). In certain cases, the substrate may be in roll form (e.g., single ply). In certain techniques, the method may involve spraying the insect control composition in substantially liquid form (e.g., as mixed with a fluid carrier) onto the substrate. Excess insect control composition may be removed, by mechanical methods (e.g., squeezing via nip rolls) to produce substrates with desired level of insect control species loading. This may be determined by measuring the weights of the substrate prior to and following loading.

Any of the processes described herein may be conducted at a relatively small scale (e.g., comprising one or several devices), at a moderate scale (e.g., comprising a plurality of devices), or at large scale (e.g. in large vats).

In some cases, the method may further involve formation of an adhesive material on the loaded substrate (e.g., a fiber web comprising a plurality of glass fibers, a binder, and an insect control composition). In some such cases, more than one adhesive material may be formed on the loaded substrate. The adhesive material may be used to adhere the loaded substrate to, for example, a base material. Non-limiting examples of potentially suitable adhesives include acrylate, polyvinyl acetate, polyvinyl alcohol, polyvinylpyrrolidone, silicone latex, cyanoacrylate, epoxy, and polyurethane adhesives The substrate (e.g., a fiber web) preferably and advantageously comprises a flexible material. For example, the loaded substrate may be sufficiently mechanically flexible to allow for further modification or processing, such as by being rolled for further treatment and downstream processing. The device may be rendered and/or packaged to be in an inactivated state prior to use. For example, the device may be rolled, folded, or otherwise rendered in an inactivated state and/or may be placed in a sealed container or other packaging, for example by being placed in a sealed container and shrink-wrapped for consumer use.

Such a packaged insect control device is activated by removing any protecting packaging (e.g., shrink-wrap, self-adhesive strip cover, etc.) and/or placing the device in a desired location. For example, the insect control device can be activated upon opening a container (e.g., a shell or a case). Any packaging or container containing an insect control device can be configured be re-closable/re-sealable to permit the device to prevent further release of the pyrethroid or other active species from the device during storage. The container housing or comprising the device may then be re-opened for subsequent use.

In some configurations, the insect control device described herein may comprise one or more additional materials, components, and/or methods described in co-owned U.S. Patent Publication Number 2015/0359227, entitled "Insect Control Device and Associated Methods", filed May 19, 2015 and in International Patent Publication Number US2015/031630, entitled "Insect Control Device and Associated Methods", filed May 19, 2015, each of which is incorporated herein by reference in its entirety.

EXAMPLES

Example 1

The following example demonstrates the efficacy of an exemplary insect control device, as described herein, against several types of flies including mosquitos.

hours that the insects remained in the chambers, they were fed). After that period mortality was recorded.

Results are summarized in Table 1. The insect control device produced 100% knockdown for *Aedes aegypti* and *Phlebotomus papatasi* at 2 hours and nearly complete knockdown for *Anopheles quadrimaculatus. Culex quinquefasciatus* appeared more tolerant to exposure to Transfluthrin at 2 hours than all the species tested except for *Stomoxys calcitrans*. At 24 hours complete mortality was observed for all five species of insect tested.

TABLE 1

|  | *Aedes aegypti* | | *Culex quinque-fasciatus* | | *Anopheles quadri-maculatus* | | All mosquito species | | *Stomoxys calcitrans* | | *Phlebotomus papatasi* | |
| --- | --- | --- | --- | --- | --- | --- | --- | --- | --- | --- | --- | --- |
|  | Untreated Control | | Untreated Control | | Untreated Control | | Untreated Control | | Untreated Control | | Untreated Control | |
|  | 2 Hr. KD | 24 Hr. Mort | 2 Hr. KD | 24 Hr. Mort | 2 Hr. KD | 24 Hr. Mort | 2 Hr. KD | 24 Hr. Mort | 2 Hr. KD | 24 Hr. Mort | 2 Hr. KD | 24 Hr. Mort |
| Percent | 0.4 | 3.0 | 0.2 | 3.0 | 1.2 | 3.8 | 0.6 | 3.3 | 0.5 | 3.1 | 1.1 | 3.0 |
| SE | 0.4 | 1.9 | 0.3 | 2.0 | 1.1 | 2.3 | 0.3 | 0.3 | 0.5 | 1.3 | 0.4 | 1.9 |
|  | Device | | Device | | Device | | Device | | Device | | Device | |
|  | 2 Hr. KD | 24 Hr. Mort | 2 Hr. KD | 24 Hr. Mort | 2 Hr. KD | 24 Hr. Mort | 2 Hr. KD | 24 Hr. Mort | 2 Hr. KD | 24 Hr. Mort | 2 Hr. KD | 24 Hr. Mort |
| Percent | 100.0 | 100.0 | 84.7 | 100.0 | 99.9 | 100.0 | 94.7 | 100.0 | 67.0 | 100.0 | 100.0 | 100.0 |
| SE | 0.0 | 0.0 | 9.2 | 0.0 | 0.2 | 0.0 | 5.1 | 0.0 | 12.9 | 0.0 | 0.0 | 0.0 |

A laboratory trial was conducted to determine the efficacy of an insect control device comprising a fiber web (comprising a plurality of glass fibers and a urea-formaldehyde binder) and Transfluthrin-impregnated within the fiber web (at 1.5 grams, total) against three mosquito species: *Aedes aegypti*, *Culex quinquefasciatus*, and *Anopheles quadrimaculatus*; a stable fly, *Stomoxys calcitrans*, and a sand fly, *Phlebotomus papatasi*, for 2-hour knockdown (KD) and 24 hour kill rate (Mort). The particular fiber web substrate used in this example is commercially available from Saint Gobain under the trade name FibaFuse™ (comprising a plurality of glass fibers and a urea-formaldehyde binder). It was 1290 square centimeters in size and 0.432 mm in thickness (1.1625 milligrams per square centimeters). Sheets were treated via a dip method placing the sheets in a bath comprising the Transfluthrin in an organic solvent/surfactant solution, and then dried overnight. The loaded fiber web was aged for 21 days prior to testing.

Figure 3:
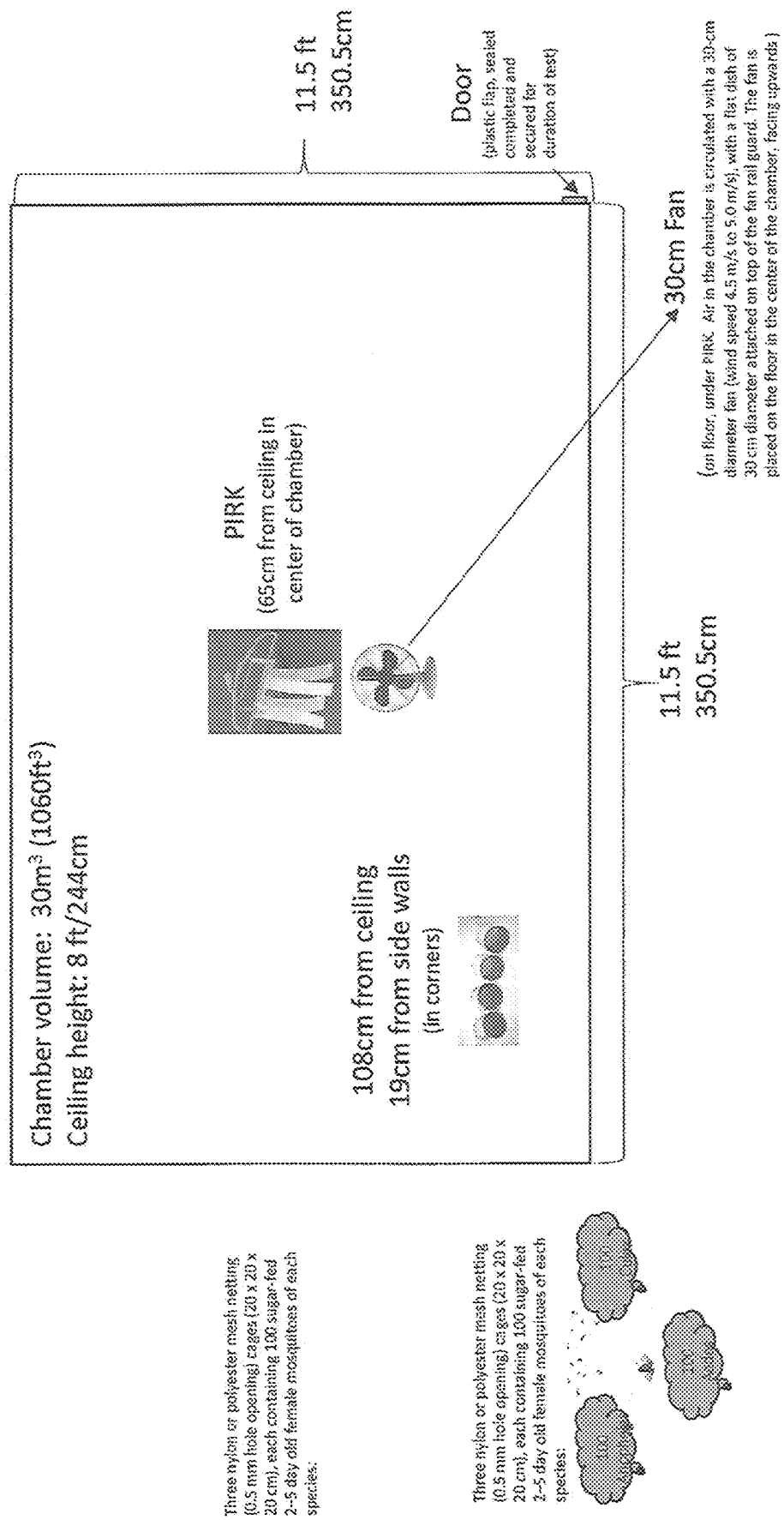
FIG. 3 is a schematic illustration of a test chamber set up used to test the insect control devices under limited indoor conditions as described in Example 1.

The insect control device was placed in the center of a 30 m³ chamber, suspended at 65 centimeters from the ceiling, with four stands, one in each corner (see FIG. 3). Each stand contained one set of two arms at right angles to each other at a height of 60 inches from the floor and another set of arms at a height of 12 inches from the floor. A 23 cm diameter fan with a flat dish of 27 cm diameter attached on top of the fan rail guard was placed on the floor, under the insect control device to provide air circulation in the chamber. The fan was placed on the floor in the center of the chamber, facing upwards. At each level, one cage of 20 insects of one of the five species was clamped to one of the arms. The cages of insects were exposed to the insect control device for two hours. After the exposure period, the number of knocked down insects in each cage was recorded and the cages remained in the room for 24 hours (during the 24

Example 2

The following example demonstrates the use of an exemplary insect control device in limited outdoor conditions. The insect control device was the same as that described above for Example 1. The loading of the device was also performed as described above for Example 1, except that the devices were not aged for 21 days prior to testing.

Three tests were conducted in a rectangular outdoor tent, dimensions 10×15 (circus roof with a 10 foot peak). The 10 ft. sides of the tent were open to the environment, while the 15 ft. sides were closed. The temperature on both testing days ranged from appx. 72-85 degrees at the high, humidity in the mid 60-75%. The insect control devices were not aged (i.e. they were treated, dried, packaged, and stored until testing). Species tested included *Aedes aegypti* (30 per test device, 30 in control).

Figure 4A:
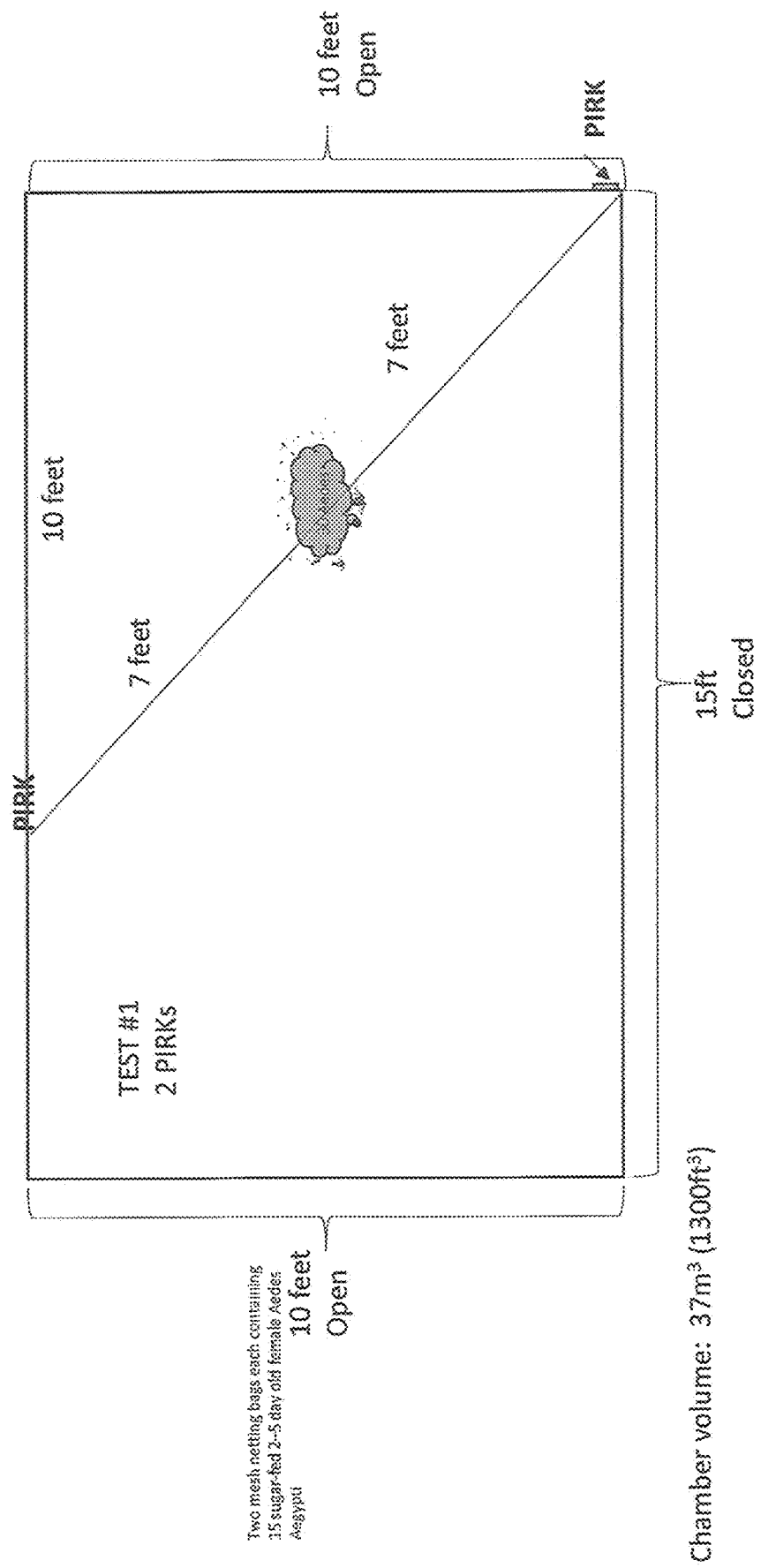
FIG. 4A is a schematic illustration of a first test chamber set up used to test the insect control devices under limited outdoor conditions as described in Example 2 (Test #1)

Test #1: (See FIG. 4A). A 10×15 area (150 sq. feet) with 2 insect control devices (PIRK) placed diagonally across from each other with 30 mosquitos placed in center of the structure. Insect control devices were deployed two hours prior to testing. Mosquitos were removed after 1 hour exposure to the insect control device, placed in a cup and fed for 24 hours. These mosquitos had a 24 hour kill rate of 97.6%.

Figure 4B:
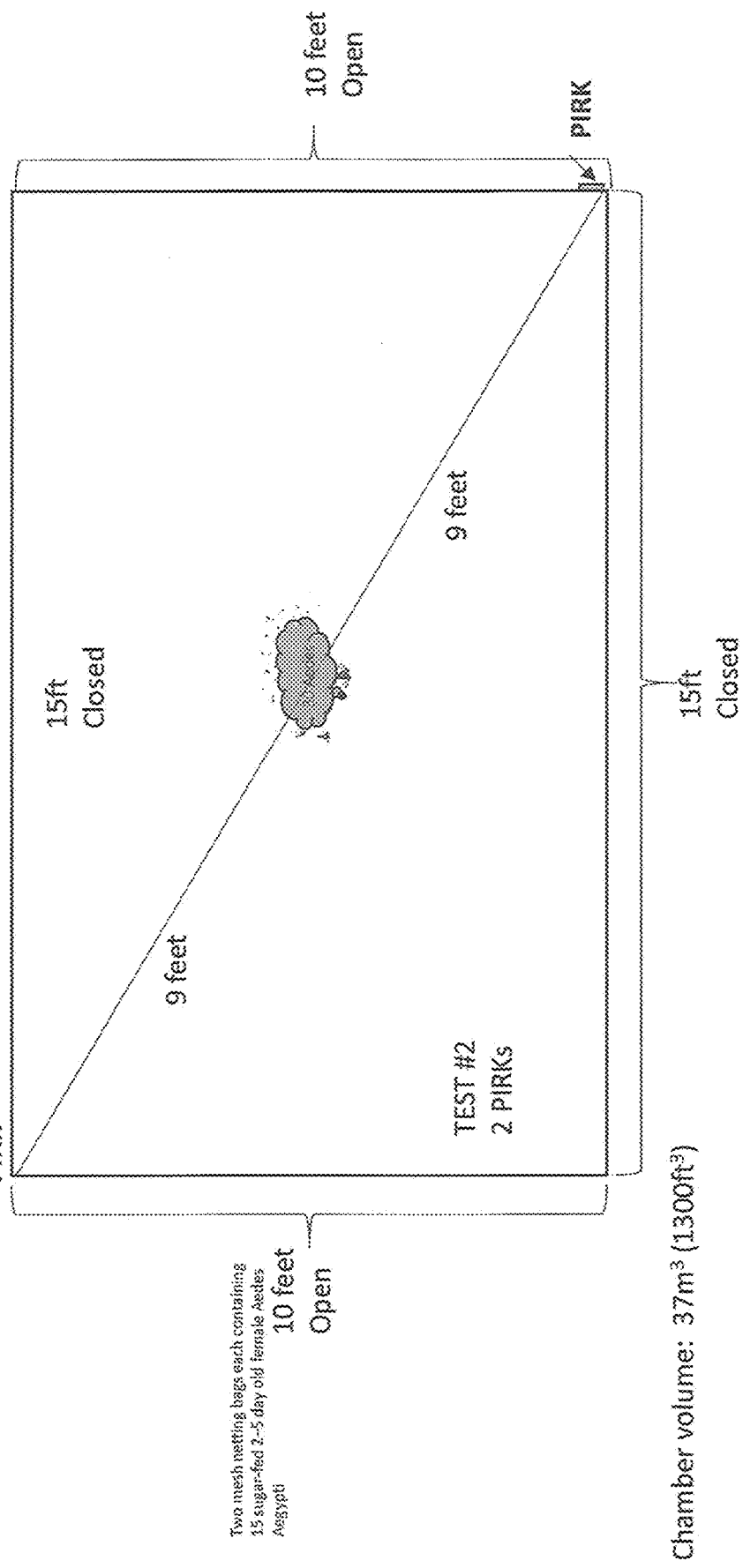
FIG. 4B is a schematic illustration of a second test chamber set up used to test the insect control devices under limited outdoor conditions as described in Example 2 (Test #2)

Test #2: (See FIG. 4B). A 10×15 area (150 sq. feet) with 2 insect control devices (PIRK) placed diagonally across from each other with 30 mosquitos placed in center of the structure. Insect control devices were deployed two hours prior to testing. Mosquitos were left outside in the structure overnight with the insect control devices deployed and fed after 2 hours of exposure. These mosquitos had a 24 hour kill rate of 100%.

Test #3: (See FIG. 4C). A 10×15 area (150 sq. feet) with 1 insect control device (PIRK) placed in the southwest (SW)

corner of the structure and 3 bags of 30 mosquitos each placed at 7, 14 and 18 feet respectively, from the insect control device. Mosquitos were removed from the structure after 1 hour of exposure to the insect control device, placed in a cup and fed for 24 hours. These mosquitos had a 24 hour kill rate of 93%.

Control: 0% knockdown (KD) for all intervals. Mosquitoes were placed in two mesh bags (15 in each bag).

Summaries of the 2-hour knockdown test results are summarized in Tables 2-4. Results are provided at various time intervals (e.g., at 10 minutes, at 30 minutes, etc.).

TABLE 2

| TEST #1 (10 × 10) | @ 10 minutes | @ 30 minutes | @ 1 hour |
| --- | --- | --- | --- |
| Knockdown | 100% | 100% | 100% |

TABLE 3

| TEST #2 (10 × 15) | @ 10 minutes | @ 30 minutes | @ 1 hour |
| --- | --- | --- | --- |
| Knockdown | 90% | 100% | 100% |

TABLE 4

| TEST #3 | @ 10 minutes | @ 15 minutes | @ 20 minutes |
| --- | --- | --- | --- |
| Knockdown @ 7 ft. | 70% | 90% | 100% |
| Knockdown @ 14 ft. | 70% | 95% | 100% |
| Knockdown @ 18 ft. | 65% | 100% | 100% |

Figure 4C:
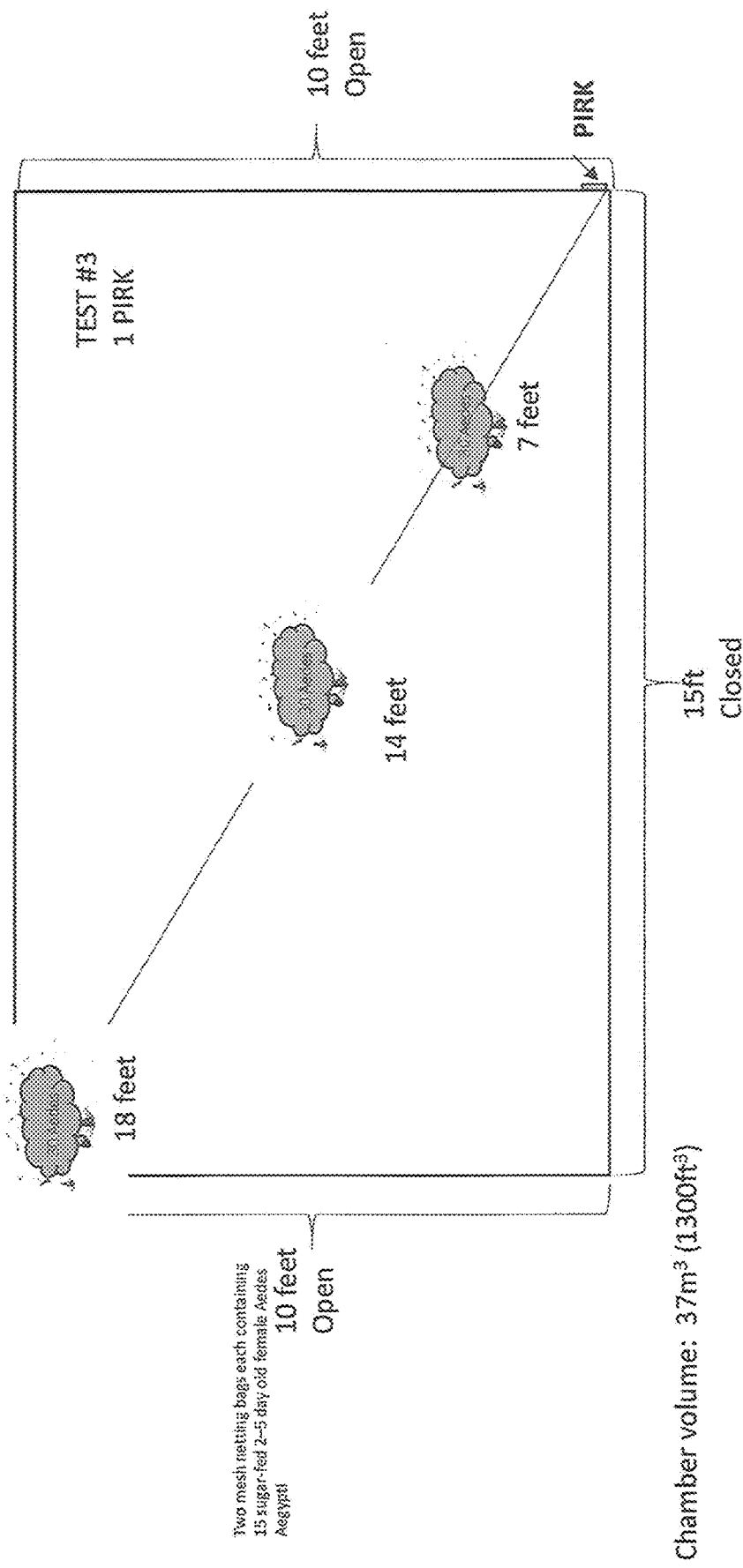
FIG. 4C is a schematic illustration of a third test chamber set up used to test the insect control devices under limited outdoor conditions as described in Example 2 (Test #3)

Additional tests were performed using the set illustrated in FIG. 4C, as described above, testing the effects of multiple PIRKS (TESTS #4 and #5) (TEST #4 differed from #5 in that the tent enclosure was smaller—10×10 versus 10×15) and different positioning of the PIRK (TEST #6). The results are presented in Table 5. Below.

TABLE 5

| TEST | DESCRIPTION | KNOCKED DOWN | MORBID/DEAD |
| --- | --- | --- | --- |
| #4 | 10 × 10, 2 PIRKS | 98% (1 HR) | 98% (24 HR) |
| #5 | 10 × 15, 2 PIRKS | 100% (2 HR) | 100% (24 HR) |
| #6 | 10 × 15, 1 PIRK 7, 14 & 18 FT AWAY | 100% (1 HR) | 91-97% (97, 91, 91) (24 HR) |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An insect control device, comprising:
   a substrate comprising a fiber web comprising a plurality of glass fibers; and
   an insect control composition coating the fiber web,
   wherein the insect control composition coats the fiber web in an amount of greater than or equal to 0.39 milligrams per square centimeter of geometric surface area and less than or equal to 5 milligrams per square centimeter of geometric surface area, and
   wherein the insect control device is configured for passive release of the insect control composition from the fiber web without the need for use with any powered air circulation, flame, physical manipulation or heating device via release of a vapor containing the insect control composition into a surrounding environment under ambient conditions and at ambient temperature, the released vapor containing an amount of the insect control composition sufficient to knock down and/or kill flying insects within an area surrounding the insect control device for at least 1 day.

2. The insect control device of claim 1, wherein the fiber web further comprises a binder.

3. The insect control device of claim 2, wherein the binder comprises urea and formaldehyde.

4. An insect control device, comprising:

a substrate comprising a fiber web comprising a plurality of glass fibers and a binder; and an insect control composition present within the fiber web, wherein the binder comprises urea and formaldehyde, wherein the insect control composition is present within the fiber web in an amount of greater than or equal to 0.39 milligrams per square centimeter of geometric surface area and less than or equal to 12 milligrams per square centimeter of geometric surface area, and wherein the insect control device is configured to passively release the insect control composition from the fiber web without the need for use with any powered air circulation, flame, physical manipulation or heating device via release of a vapor containing the insect control composition into a surrounding environment under ambient conditions and at ambient temperature, the released vapor containing an amount of the insect control composition sufficient to knock down and/or kill flying insects within an area surrounding the insect control device for at least 24 hours.

5. A method for fabricating an insect control device, comprising:

contacting a substrate comprising a fiber web comprising a plurality of glass fibers and a binder with an insect control composition, wherein the binder comprises urea and formaldehyde and wherein the insect control composition is present within the fiber web in an amount of greater than or equal to 0.39 milligrams per square centimeter of geometric surface area and less than or equal to 12 milligrams per square centimeter of geometric surface area; and passively releasing the insect control composition from the fiber web without the need for use with any powered air circulation, flame, physical manipulation or heating device via release of a vapor containing the insect control composition into a surrounding environment under ambient conditions and at ambient temperature, the released vapor containing an amount of the insect control composition sufficient to knock down and/or kill flying insects within an area surrounding the insect control device for at least 1 day.

6. The method for fabricating an insect control device of claim 5, wherein the insect control composition is present within the fiber web in an amount of greater than or equal to 0.39 milligrams per square centimeter of geometric surface area and less than or equal to 5 milligrams per square centimeter of geometric surface area.

7. The method for fabricating an insect control device of claim 5, wherein the insect control composition is present within the fiber web in an amount of between 5 and 9.4 milligrams per square centimeter of geometric surface area.

8. A method for controlling insects with an insect control device, comprising:

hanging the insect control device, or mounting or otherwise placing the insect control device on a surface, within an area surrounding the insect control device in which insects are to be knocked down and/or killed;

passively releasing an insect control composition from a substrate comprising a fiber web of the insect control device without the need for use with any powered air circulation, flame, physical manipulation or heating device via release of a vapor containing the insect control composition into a surrounding environment under ambient conditions and at ambient temperature, the released vapor containing an amount of the insect control composition sufficient to knock down and/or kill flying insects within the area surrounding the insect control device for at least 1 day, wherein the fiber web comprises a plurality of glass fibers; and wherein the insect control composition coats the fiber web in an amount of greater than or equal to 0.39 milligrams per square centimeter of geometric surface area and less than or equal to 5 milligrams per square centimeter of geometric surface area.

9. The method for controlling insects with an insect control device of claim 8, wherein the fiber web further comprises a binder.

10. The method for controlling insects with an insect control device of claim 9, wherein the binder comprises urea and formaldehyde.

11. A method as in claim 5, wherein the insect control composition is not substantially absorbed by individual fibers of the plurality of glass fibers.

12. An insect control device, comprising:

a non-absorptive substrate formed of fibers comprising a non-absorptive material; and an insect control composition present on the non-absorptive substrate but not absorbed into the individual fibers comprising the non-absorptive substrate, wherein the insect control device is free of any absorptive, hydrophilic substrate containing the insect control composition;

wherein the insect control composition is present on the non-absorptive substrate formed of a non-absorptive material in an amount of greater than or equal to 0.39 milligrams per square centimeter and less than or equal to 5 milligrams per square centimeter, and wherein the insect control composition is passively released from the non-absorptive substrate formed of a non-absorptive material without the need for use with any powered air circulation, flame, physical manipulation or heating device via release of a vapor containing the insect control composition into a surrounding environment under ambient conditions and at ambient temperature, the released vapor containing an amount of the insect control composition—sufficient to knock down and/or kill flying insects within an area surrounding the insect control device for at least 1 day.

13. A method for controlling insects with an insect control device, comprising:

hanging the insect control device, or mounting or otherwise placing the insect control device on a surface, within an area surrounding the insect control device in which insects are to be knocked down and/or killed;

passively releasing an insect control composition from a non-absorptive substrate formed of a non-absorptive material of the insect control device without the need for use with any powered air circulation, flame, physical manipulation or heating device via release of a vapor containing the insect control composition into a surrounding environment under ambient conditions and at ambient temperature, the released vapor containing an amount of the insect control composition sufficient to knock down and/or kill flying insects within the area surrounding the insect control device for at least 1 day, wherein the insect control device is free of any absorptive, hydrophilic substrate containing the insect control composition; and wherein wherein the insect control composition is initially present on the non-absorptive substrate formed of a non-absorptive material in an amount of greater than or equal to 0.39 milligrams per square centimeter of geometric surface area and less than or equal to 5 milligrams per square centimeter of geometric surface area.

14. An insect control device as in claim 1, wherein the insect control device has a greater than or equal to 70% kill rate within 24 hours after initial release of the insect control composition indoors.

15. An insect control device as in claim 1, wherein the insect control device has a greater than or equal to 70% kill rate within 24 hours in limited outdoor conditions.

16. An insect control device as in claim 1, wherein the insect control composition comprises a pyrethroid.

17. An insect control device as in claim 1, wherein the vapor pressure of the insect control composition is between $1 \times 10^{-4}$ and $10 \times 10^{-4}$ Pascals at 20° C.

18. An insect control device as in claim 17, wherein the vapor pressure of the insect control composition is between $6 \times 10^{-4}$ and $10 \times 10^{-4}$ Pascals at 20° C.

19. An insect control device as in claim 1, wherein, wherein ambient conditions and ambient temperature involve a temperature between 72-85° F.

20. An insect control device as in claim 1, wherein the released vapor contains an amount of the insect control composition sufficient to knock down and/or kill flying insects within an area surrounding the insect control device for at least 21 days.

21. An insect control device as in claim 4, wherein the released vapor contains an amount of the insect control composition sufficient to knock down and/or kill flying insects within an area surrounding the insect control device for at least 21 days.

22. An insect control device as in claim 12, wherein the released vapor contains an amount of the insect control composition sufficient to knock down and/or kill flying insects within an area surrounding the insect control device for at least 21 days.

23. An insect control device as in claim 1, wherein the released vapor contains an amount of the insect control composition sufficient to knock down and/or kill *Aedes aegypti* mosquitos within an enclosed 30 cubic meter chamber for at least 1 day.

24. An insect control device as in claim 4, wherein the released vapor contains an amount of the insect control composition sufficient to knock down and/or kill *Aedes aegypti* mosquitos within an enclosed 30 cubic meter chamber for at least 1 day.

25. An insect control device as in claim 12, wherein the released vapor contains an amount of the insect control composition sufficient to knock down and/or kill *Aedes aegypti* mosquitos within an enclosed 30 cubic meter chamber for at least 1 day.

26. An insect control device as in claim 16, wherein the pyrethroid comprises Transfluthrin, tefluthrin, metofluthrin, allethrin, fenfluthrin, kadethrin, neopynamins, prallethrin, vapothrin, tefluthrin, esbiothrin, dichlovos (DDVP), or a combination thereof.

* * * * *